(12) United States Patent
Kuwahara et al.

(10) Patent No.: US 10,803,894 B2
(45) Date of Patent: Oct. 13, 2020

(54) MAGNETIC DISK CONTROLLING DEVICE CAPABLE OF TRACKING DIFFERENT SERVO PATTERN FREQUENCIES

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Satoshi Kuwahara, Kawasaki Kanagawa (JP); Koji Ishii, Fujisawa Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/109,357

(22) Filed: Aug. 22, 2018

(65) Prior Publication Data
US 2019/0259415 A1    Aug. 22, 2019

(30) Foreign Application Priority Data
Feb. 21, 2018   (JP) .................................. 2018-028933

(51) Int. Cl.
*G11B 5/596* (2006.01)
*G11B 20/14* (2006.01)
*G11B 5/55* (2006.01)

(52) U.S. Cl.
CPC ........ *G11B 5/59688* (2013.01); *G11B 5/5526* (2013.01); *G11B 5/59616* (2013.01); *G11B 20/1403* (2013.01); *G11B 5/5539* (2013.01); *G11B 5/5543* (2013.01)

(58) Field of Classification Search
None
See application file for complete search history.

(56) References Cited

U.S. PATENT DOCUMENTS

| 5,703,850 | A | | 12/1997 | Wada | |
|---|---|---|---|---|---|
| 5,796,535 | A | * | 8/1998 | Tuttle | G11B 5/012 360/51 |
| 6,084,738 | A | * | 7/2000 | Duffy | G11B 5/5526 360/75 |
| 6,118,604 | A | * | 9/2000 | Duffy | G11B 5/5526 360/48 |
| 7,012,773 | B2 | * | 3/2006 | Ashikaga | G11B 5/59633 360/48 |
| 7,715,138 | B1 | | 5/2010 | Kupferman | |

(Continued)

*Primary Examiner* — Tan X Dinh
(74) *Attorney, Agent, or Firm* — Kim & Stewart LLP

(57) ABSTRACT

According to one embodiment, a magnetic disk device includes a magnetic disk including at least one servo zone that includes a first data storage track with a first servo pattern having a first frequency and a second data storage track with a second servo pattern having a second frequency, wherein the first data storage track is located closer to an outer diameter of the magnetic disk than the first data storage track and the first frequency is greater than the second frequency; a magnetic head that faces the magnetic disk; and a zone servo switching unit that switches a servo pattern frequency employed to position the magnetic head in a radial direction based on a radial position of the magnetic head.

15 Claims, 6 Drawing Sheets

(56) References Cited

U.S. PATENT DOCUMENTS

| | | | | |
|---|---|---|---|---|
| 8,213,106 B1* | 7/2012 | Guo | ................... | G11B 5/59688 |
| | | | | 360/29 |
| 9,019,648 B1* | 4/2015 | Kuwahara | .......... | G11B 5/59666 |
| | | | | 360/75 |
| 9,905,256 B1* | 2/2018 | Asakura | ............... | G11B 5/5547 |
| 2008/0304172 A1* | 12/2008 | Bi | ...................... | G11B 5/59655 |
| | | | | 360/48 |
| 2010/0328804 A1* | 12/2010 | Yamashita | ............... | G11B 5/09 |
| | | | | 360/51 |
| 2013/0329313 A1* | 12/2013 | Zhang | ............... | G11B 5/59655 |
| | | | | 360/51 |
| 2014/0198407 A1* | 7/2014 | Iwashiro | .............. | G11B 5/5547 |
| | | | | 360/78.09 |
| 2014/0300991 A1* | 10/2014 | Asakura | ............... | G11B 5/5547 |
| | | | | 360/78.08 |
| 2016/0180873 A1* | 6/2016 | Asakura | ............... | G11B 5/5526 |
| | | | | 360/77.07 |

\* cited by examiner

TRANSITION OF POSITIONAL DIFFERENCE BETWEEN READ HEAD AND WRITE HEAD

RELATIONSHIP BETWEEN POSITIONAL DIFFERENCE BETWEEN READ HEAD AND WRITE HEAD AND REFERENCE SFG BOUNDARY

MAGNETIC DISK CONTROLLING DEVICE CAPABLE OF TRACKING DIFFERENT SERVO PATTERN FREQUENCIES

CROSS-REFERENCE TO RELATED APPLICATIONS

This application is based upon and claims the benefit of priority from Japanese Patent Application No. 2018-028933, filed Feb. 21, 2018, the entire contents of which are incorporated herein by reference.

FIELD

Embodiments described herein relate generally to a magnetic disk device and a control method of the magnetic disk device.

BACKGROUND

Magnetic disk devices often employ a zone servo method for dividing a servo pattern into a plurality of zones, from an inner diameter side to an outer diameter side of a magnetic disk. The zone servo method increases a write frequency (reference frequency or servo frequency) of the servo pattern of the zone on the outer diameter side of the disk to be greater than a write frequency of the zone on the inner diameter side of the disk, so that the areal density of data written to the disk in each zone is roughly the same.

DETAILED DESCRIPTION

In light of the above, there is still the potential for increasing a storage capacity of a magnetic disk compared to conventional magnetic disk drives.

In general, according to one embodiment, a magnetic disk device includes at least one servo zone that includes a first data storage track with a first servo pattern having a first frequency and a second data storage track with a second servo pattern having a second frequency, wherein the first data storage track is located closer to an outer diameter of the magnetic disk than the first data storage track and the first frequency is greater than the second frequency; a magnetic head that faces the magnetic disk; and a zone servo switching unit that switches a servo pattern frequency employed to position the magnetic head in a radial direction based on a radial position of the magnetic head.

Hereinafter, the present disclosure will be described in detail with reference to the drawings. The present disclosure is not limited to the following embodiments. In addition, configurations in the following embodiments include elements that can be easily assumed by those skilled in the art or elements that are substantially the same.

Embodiment

Figure 1:
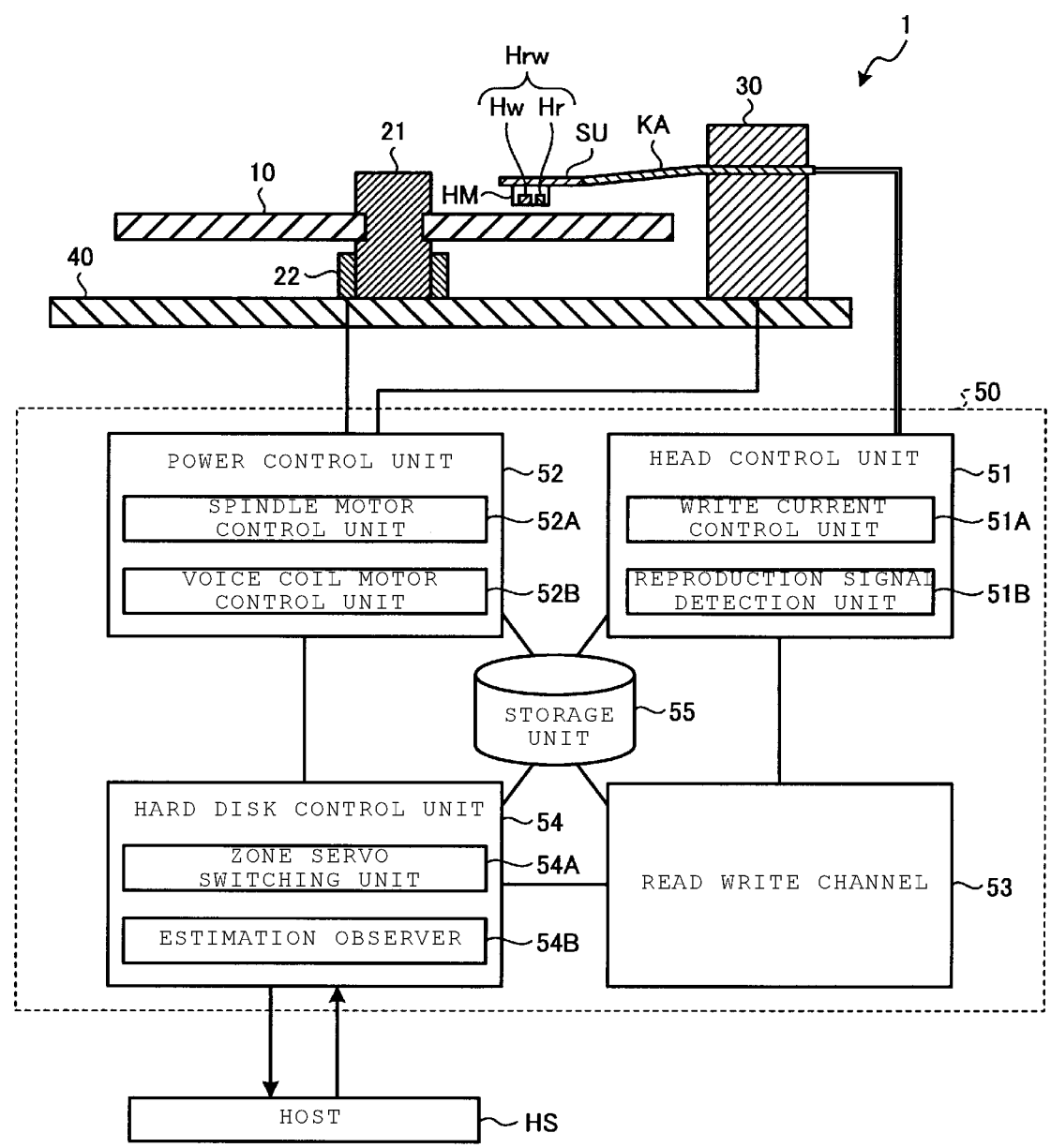
FIG. 1 is a diagram illustrating an overall configuration of a magnetic disk device according to an embodiment.

A magnetic disk device according to an embodiment will be described with reference to FIGS. 1 to 8.
Overall Configuration Example of Magnetic Disk Device FIG. 1 is a diagram illustrating an overall configuration of a magnetic disk device 1 according to an embodiment. The magnetic disk device 1 is, for example, a hard disk drive externally attached to a host HS or built therein.

As illustrated in FIG. 1, the magnetic disk device 1 includes a magnetic disk 10, a spindle 21, a spindle motor 22, a head slider HM, a suspension SU, a carriage arm KA, a voice coil motor 30, a base 40, and a control unit 50.

The magnetic disk 10 is a disk-shaped recording medium for magnetically recording various kinds of information, and is rotationally driven by the spindle motor 22. The magnetic disk 10 has, for example, a plurality of concentric zones around a periphery of a rotation center of the spindle motor 22. Each zone further includes a plurality of concentric tracks. In each track, a plurality of data areas and servo areas (not illustrated) are alternately disposed in a circumferential direction. A detailed configuration of the magnetic disk 10 will be described below.

The head slider HM is disposed on the magnetic disk 10. The head slider HM includes a magnetic head Hrw. The magnetic head Hrw includes a read head Hr and a write head Hw. The read head Hr and the write head Hw are disposed so as to face the magnetic disk 10 at a position which floats approximately 10 nm from the magnetic disk 10.

The head slider HM is held on the magnetic disk 10 via the suspension SU and the carriage arm KA. The carriage arm KA slides the head slider HM in a horizontal plane during seeking or the like. The suspension SU gives the magnetic head Hrw a pushing force against a floating force of the magnetic head Hrw, and thereby, a floating height of the magnetic head Hrw on the magnetic disk 10 is constant. The floating force of the magnetic head Hrw is caused by an air flow when the magnetic disk 10 rotates. The suspension SU is configured with, for example, a leaf spring.

The voice coil motor 30 drives the carriage arm KA. The spindle motor 22 rotates the magnetic disk 10 around the spindle 21. The voice coil motor 30 and the spindle motor 22 are fixed to the base 40.

The control unit 50 is a control circuit that includes a head control unit 51, a power control unit 52, a read write channel 53, a hard disk control unit 54, and a storage unit 55, and controls each unit of the magnetic disk device 1. For example, the control unit 50 controls a position (radial position) in a radial direction of the read head Hr and the write head Hw for the magnetic disk 10, based on servo data read by the read head Hr.

The head control unit 51 includes a write current control unit 51A and a reproduction signal detection unit 51B, and amplifies or detects a signal during recording (writing of data) and reproduction (reading of data). The write current control unit 51A controls a write current flowing through the write head Hw. The reproduction (read) signal detection unit 51B detects a signal read by the read head Hr.

The power control unit 52 includes a spindle motor control unit 52A and a voice coil motor control unit 52B, and drives the spindle motor 22 and the voice coil motor 30. The spindle motor control unit 52A controls a rotation of the spindle motor 22. The voice coil motor control unit 52B drives the voice coil motor 30.

The read write channel 53 exchanges data between the head control unit 51 and the hard disk control unit 54. Such data includes read data, write data, and servo data. For example, the read write channel 53 converts a signal read by the read head Hr into a data format handled by the host HS, and converts data output from the host HS into a signal format written by the write head Hw. In addition, the read write channel 53 performs decoding processing of a signal read by the read head Hr, and performs code modulation of data output from the host HS.

The hard disk control unit 54 performs recording (writing) and reproduction (reading) control based on a command from the host HS, and exchanges data between the host HS and the read write channel 53. The hard disk control unit 54 includes a zone servo switching unit 54A and an estimation observer 54B. The zone servo switching unit 54A is, for example, a switch circuit that switches a servo pattern frequency in servo processing depending on which zone of the magnetic disk 10 the magnetic head Hrw is in. The servo processing includes decoding the servo data, reading the servo data, and determining a position of the magnetic head Hrw based on the servo data. The estimation observer 54B is, for example, an estimation circuit that estimates a radial position of the magnetic head Hrw on the magnetic disk 10 from, for example, the past history of the position of the magnetic head Hrw. Detailed functions of the zone servo switching unit 54A and the estimation observer 54B will be described below.

The storage unit 55 stores various setting parameters for an operation of the magnetic disk device 1, setting values of a reference servo frequency generation (SFG) provided for each zone, setting values of SFG for a uniform frequency area, and the history of previous positions of the magnetic head Hrw used for calculating an estimated position via the estimation observer 54B.

The control unit 50 is connected to the host HS. The host HS may be a personal computer that issues a write command, a read command, or the like to a magnetic disk device, or may be a network connectable to a server or the like.

In the magnetic disk device 1 configured as described above, while the magnetic disk 10 is rotated by the spindle motor 22, a signal is read from the magnetic disk 10 via the magnetic head Hrw and detected by the reproduction signal detection unit 51B. The signal detected by the reproduction signal detection unit 51B is converted into data by the read write channel 53, and then is sent to the hard disk control unit 54. In the hard disk control unit 54, tracking control of the magnetic head Hrw is performed based on servo data in the signal detected by the reproduction signal detection unit 51B.

In addition, a current position of the magnetic head Hrw is calculated based on the servo data detected by the reproduction signal detection unit 51B, and a seek control is performed such that the magnetic head Hrw approaches a target position. If the magnetic head Hrw reaches the target position, a signal is read from the magnetic disk 10 via the magnetic head Hrw, or data is written to the magnetic disk 10 via the magnetic head Hrw.

Configuration Example of Magnetic Disk

Figure 2:
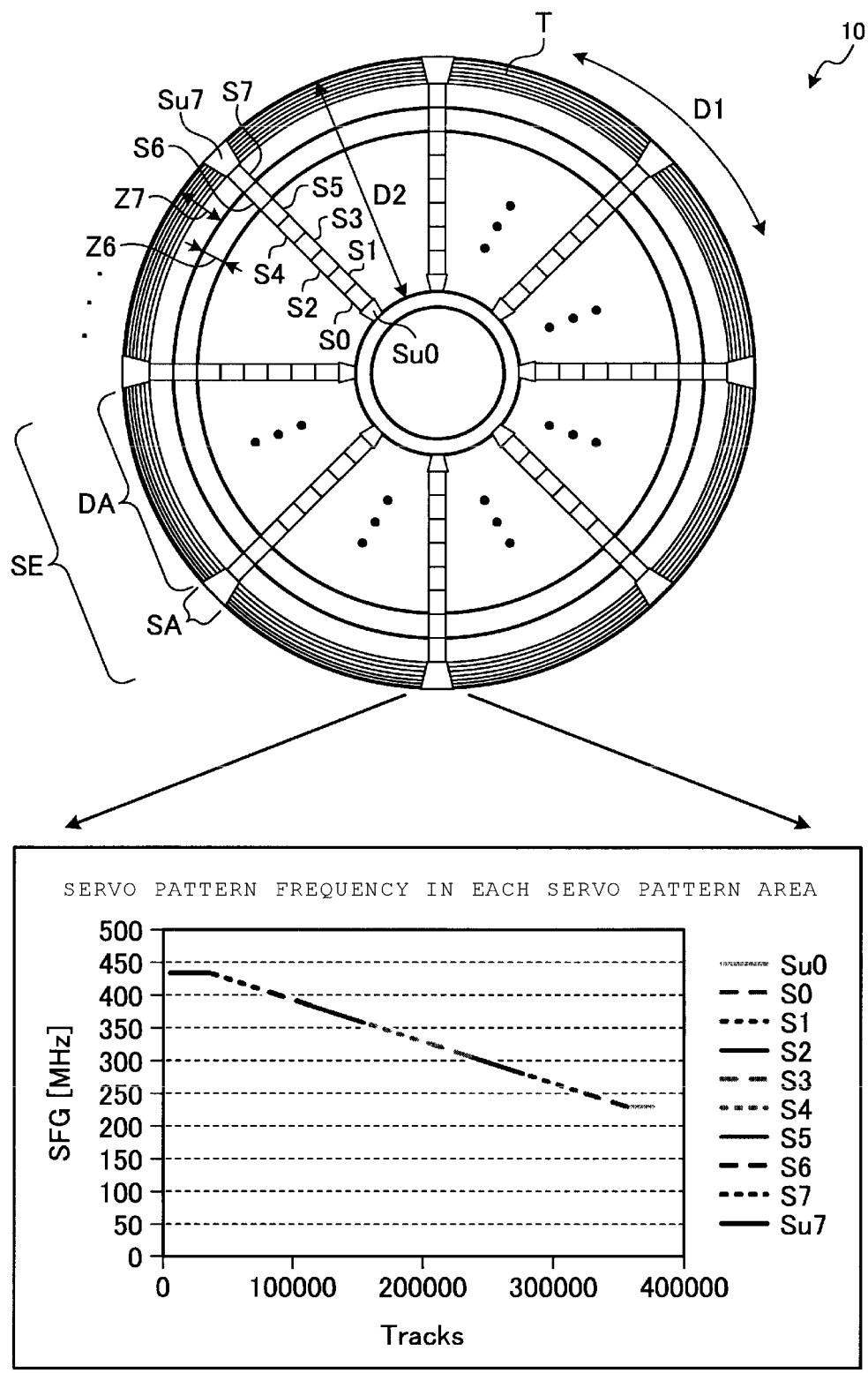
FIG. 2 is a diagram illustrating a configuration of the magnetic disk according to the embodiment.

Next, an example configuration of the magnetic disk according to the embodiment will be described with reference to FIG. 2. FIG. 2 is a diagram illustrating a configuration of the magnetic disk 10 according to the embodiment. In FIG. 2, an upper portion is a plan view of the magnetic disk 10, and a lower portion is a graph of the servo pattern frequency of the magnetic disk 10.

As illustrated in the upper stage of FIG. 2, the magnetic disk 10 includes a plurality of tracks T that are formed in a circumferential direction D1. Disposed in each track T are data areas DA, in which user data is written, and servo areas SA, in which servo data is written. A sector SE is configured to include a data area DA and a servo area SA from each track T. For example, the servo area SA extends radially, and the data area DA is disposed between two servo areas SA that are adjacent in a circumferential direction D1. Width of each servo area SA in the circumferential direction D1 is constant and does not change between an outer diameter (OD) side and an inner diameter (ID) side of the magnetic disk 10.

In addition, the magnetic disk 10 is divided into a plurality of zones, for example, zones Z0 to Z7, in the radial direction D2. The outermost circumference side is zone Z7, and the innermost circumference side is zone Z0.

In each servo area SA, servo patterns S0 to S7 are arranged so as to correspond to zones Z0 to Z7, respectively. A reference SFG is set in each of the servo patterns S0 to S7. The SFG is a reversal rate of a magnetic pole SN per unit time of the magnetic disk and is a frequency at which data is written in the servo pattern.

The SFG is also called a servo pattern frequency. In other words, an area where the same SFG is employed is one zone, and the zones Z0 to Z7 do not necessarily have physical boundaries with each other. The reference SFG set for each of the servo patterns S0 to S7 is selected to decrease from an OD side to an ID side. In addition, even within the respective servo patterns S0 to S7, the servo pattern frequency decreases from the OD side of the magnetic disk 10 to the ID side of the magnetic disk 10. That is, within the respective zones Z0 to Z7, the servo pattern frequency continuously decreases from the OD side to the ID side.

In setting the reference SFG based on a function generated by the current hardware, the reference SFG can be set by dividing into a maximum of eight zones. By contrast, if zones are divided based on software, the zones are not restricted by performance of hardware functions, and thus, it is possible to divide the zones more precisely when setting the reference SFG. Thus, by precisely dividing the zones, switching of the servo pattern frequency is also easily made. The example of FIG. 2 illustrates a case in which the reference SFG is set by dividing the magnetic disk 10 into eight zones (zones Z0 to Z7).

Uniform frequency areas Su0 and Su7 having constant servo pattern frequencies are respectively disposed at an end of the servo patterns S0 to S7 in a radial direction D2, that is, in an area adjacent to the servo pattern S0 and an area adjacent to the servo pattern S7. When the magnetic head Hrw is loaded on the magnetic disk 10, the magnetic head Hrw reads servo data from the OD side of the magnetic disk 10. In addition, during return seek operations, the magnetic head Hrw reads servo data from the ID side of the magnetic disk 10. The return seek is a seek operation performed when returning after an error occurs. A return seek is an operation performed after a position of the magnetic head Hrw is determined by pressing the magnetic head Hrw toward the closest ID against a mechanical stop (not illustrated) disposed on the base 40. By providing the uniform frequency areas Su0 and Su7 at both ends of the servo patterns S0 to S7, servo lock (servo data reading for position determination) during loading and return seeks is easily performed. Similar to the servo pattern S0, the uniform frequency area Su0 is in the zone Z0. Similar to the servo pattern S7, the uniform frequency area Su7 is in the zone Z7.

The lower portion of FIG. 2 illustrates a graph of the servo pattern frequency in each area of the servo patterns S0 to S7. A horizontal axis of the graph is a track number corresponding to each area of the servo patterns S0 to S7. A side with the smaller track number is the OD side and a side with the larger track number is the ID side. A vertical axis of the graph is the servo pattern frequency (MHz). As shown, in the embodiment illustrated in FIG. 2, the servo pattern frequency in uniform frequency area Su0 is constant at approximately 230 MHz, the servo pattern frequency in servo pattern S0 varies from approximately 230 MHz to 255 MHz, the servo pattern frequency in servo pattern S1 varies from approximately 255 MHz to 280 MHz, the servo pattern frequency in servo pattern S2 varies from approximately 280 MHz to 305 MHz, and so on.

Figure 3:
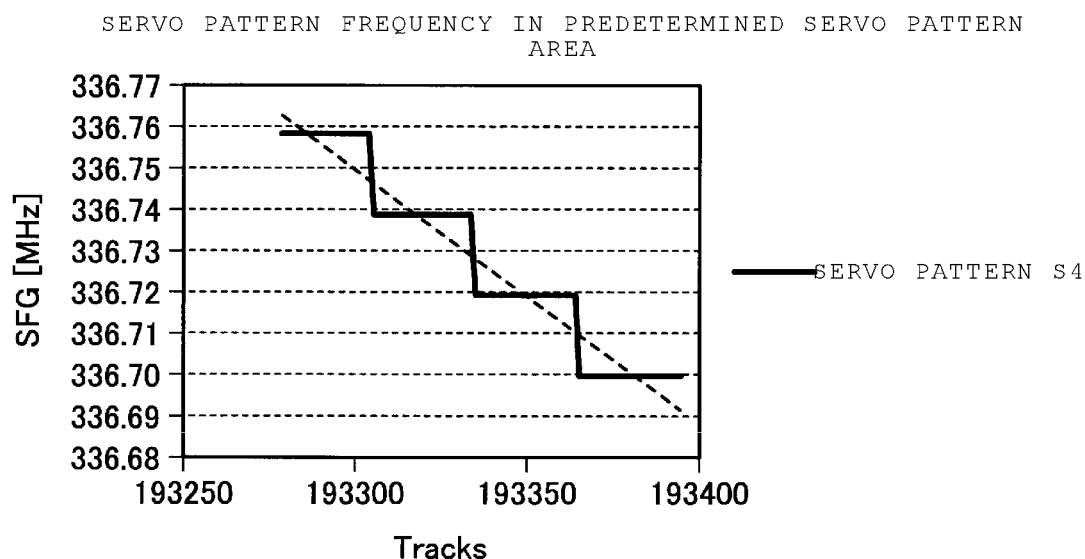
FIG. 3 is a graph of servo pattern frequencies in one servo pattern.

FIG. 3 illustrates a graph of a more detailed servo pattern frequency. FIG. 3 is a graph of the servo pattern frequency in one servo pattern (for example, a portion of the servo pattern S4). As illustrated in FIG. 3, when viewed on a finer scale, the servo pattern frequency changes in a stepwise fashion. In the example of FIG. 3, the servo pattern frequency changes stepwise in approximately 0.0195 MHz increments for each of the approximately 150 tracks shown. This step difference (resolution) can be implemented based on a write clock tracking function of the read write channel 53. Thus, if the write clock tracking function is improved, the resolution can be improved and the stepwise change in the servo pattern frequency can also be made more finely. In the present specification, "the servo pattern frequency continuously changes" also refers to cases in which the servo pattern frequency changes stepwise (i.e., gradually) within a range of the resolution available in the magnetic disk device 1.

Function of Zone Servo Switching Unit

In order to enable servo processing of the magnetic disk 10 described above, the zone servo switching unit 54A switches the servo pattern frequency employed in servo control of the radial position of the magnetic head Hrw, based on an address of a target track. More specifically, the zone servo switching unit 54A switches the reference SFG, according to the address of the target track. In so doing, the zone servo switching unit 54A adds a value obtained by adding the amount of offset from a disk synchronous write (DSW) correction value (which corresponds to an address of a target track) to the reference SFG. The DSW correction value that is obtained by adding the amount of offset can be obtained by the following equation:

$$dsw\_s\_flp0 = (SvINT\_Target\_Zx + svitv\_offset(x) - Sv\_interval) \times K(x) + dsw\_offset(x)$$

where, dsw_s_flp0: DSW frequency correction value, x: track address, SvINT Target Zx: servo interval theoretical value of the zone, svitv_offset(x): servo interval offset amount according to the radius position, Sv (Saturation voltage)_interval: measured servo interval, K(x): DSW conversion coefficient according to the radius position, dsw_offset(x): servo clock offset amount according to the radius position.

Figure 4:
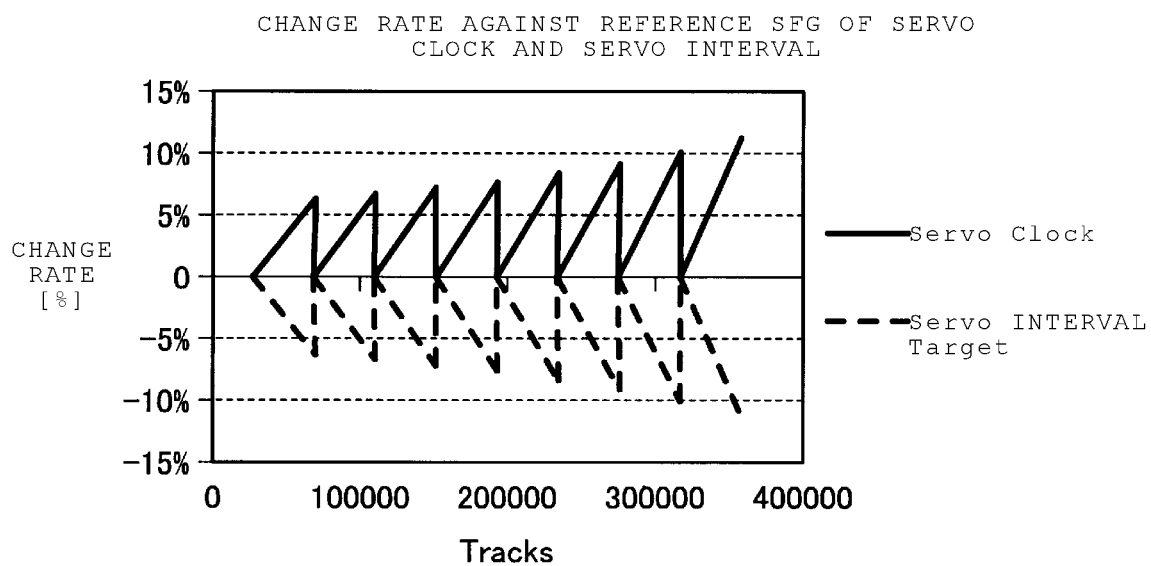
FIG. 4 is a graph illustrating change rates of a servo clock and a servo interval with respect to a reference SFG.

According to the above equation, for example, when the magnetic head Hrw is moved from the OD side to the ID side of the magnetic disk 10, the servo pattern frequency changes in a decreasing direction with respect to the reference SFG setting. That is, an offset is given so as to lower the servo clock. The servo clock is a signal that the magnetic disk device 1 follows when decoding servo data. Meanwhile, a servo interval is an interval during which the servo data is acquired. As the servo clock decreases, the servo interval measured in the hard disk control unit 54 changes in a direction in which the servo interval increases in duration. Thus, the zone servo switching unit 54A changes a target value of the servo interval in a direction in which the target value increases. This state is illustrated in FIG. 4. FIG. 4 is a graph illustrating a change rate of the servo clock and the servo interval relative to the reference SFG.

In addition, the servo pattern frequency changes for each servo interval. The estimation observer 54B can estimate the radial position from the change, and perform tracking by more precisely configuring the correction value according to the estimated position information. For example, the estimation observer 54B estimates the radial position from the history of previous radial positions of the magnetic head Hrw. That is, a current position of the magnetic head Hrw is estimated based on, for example, the positions of the magnetic head Hrw for the past several times that radial position is measured, including the position of the magnetic head Hrw immediately before the seek operation starts. For example, the amount of change in the servo pattern frequency of a magnetic disk having the maximum speed in a seek operation of 1.2 m/s, a track density of 483 kTPI (thousands of tracks/inch), and a servo sector number of 372, is considered. In the case of the magnetic disk, the magnetic head Hrw proceeds a maximum of 681 tracks during one servo interval. The amount of change in the servo pattern frequency during this time (i.e., across this group of tracks) is 0.513 MHz. This amount of change can be corrected by the estimation observer 54B.

Figure 5:
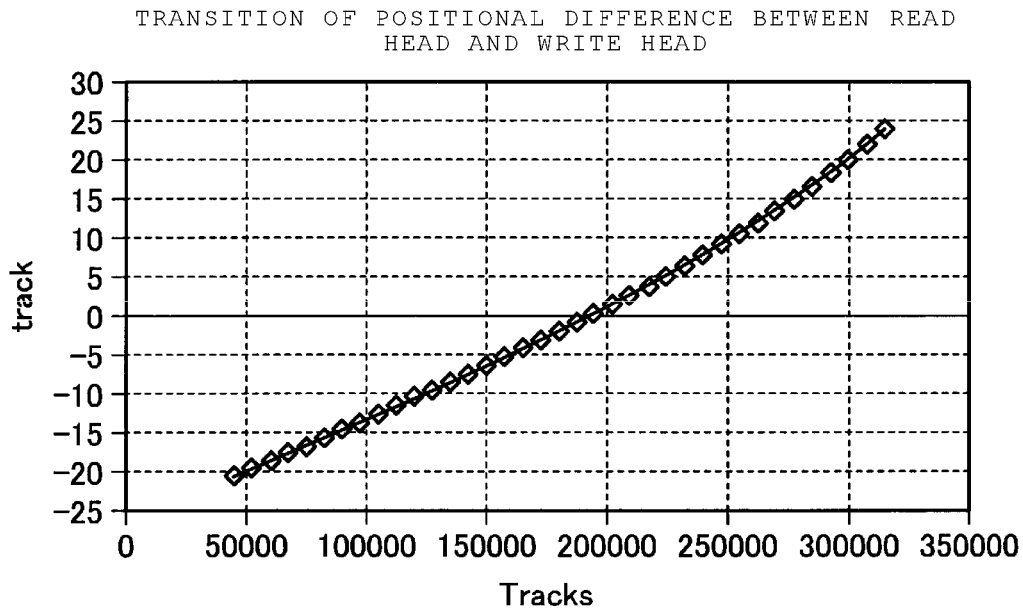
FIG. 5 is a graph illustrating transition of a positional difference between a read head and a write head.

In addition, the servo pattern frequency may change between a position of the read head Hr and a position of the write head Hw, depending on the position of the magnetic head Hrw. For example, if the magnetic disk has a track density of 483 kTPI, a difference between the positions of the magnetic head Hrw is approximately 30 tracks at maximum and corresponds to a resolution (0.0195 MHz) of the above-described servo pattern frequency. This situation is illustrated in FIG. 5. FIG. 5 is a graph illustrating variation of positional differences between the read head Hr and the write head Hw. As illustrated in FIG. 5, the positional difference between the read head Hr and the write head Hw is at a minimum number of tracks when the magnetic head Hrw is near the center of a radius of the magnetic disk 10. That is, the number of tracks separating the read head Hr and the write head Hw is minimized. Then, an absolute value of the number of separating tracks increases toward the OD side and the ID side.

Figure 6:
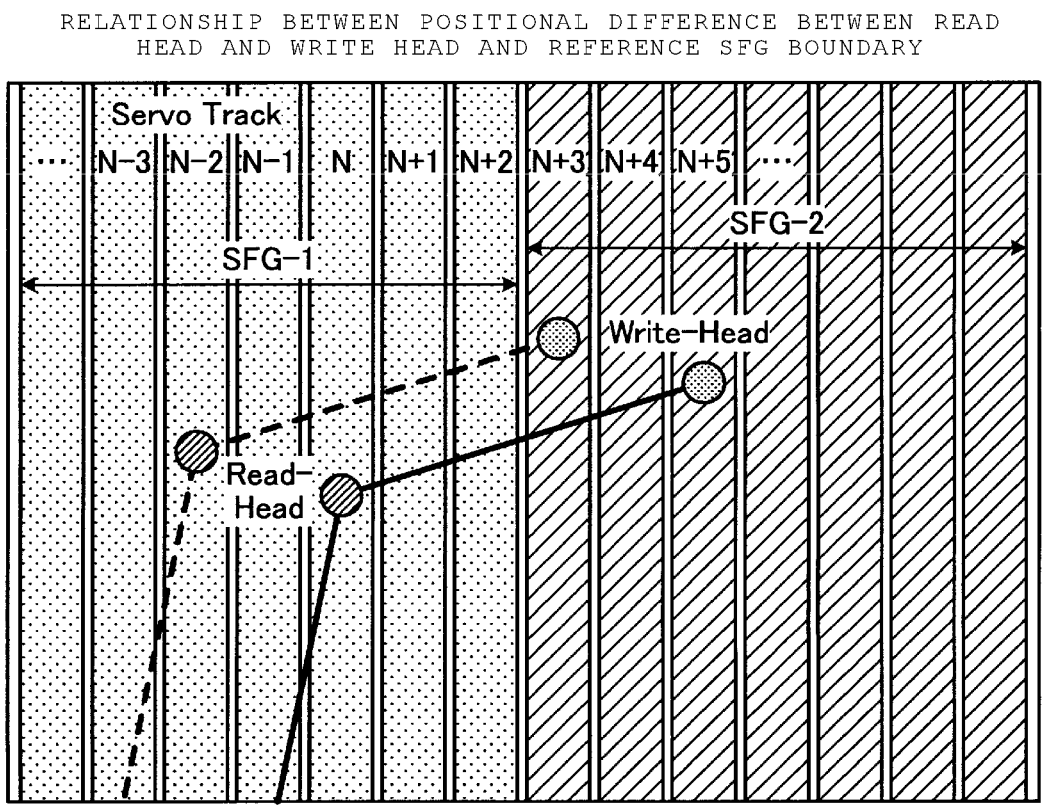
FIG. 6 is a diagram illustrating a relationship between the positional difference between the read head and the write head and a reference SFG boundary.

FIG. 6 further illustrates the details. FIG. 6 is a diagram illustrating a relationship between the positional difference between the read head Hr and the write head Hw and the reference SFG boundary. In the example of FIG. 6, a switching track for the reference SFG is a boundary between the track(N+2) and the track(N+3). Meanwhile, in a plot of a solid line and a dotted line illustrating the positional difference between the read head Hr and the write head Hw, a switching track for an offset of a clock when reading and writing using the position of the read head Hr as a reference straddles the track(N−1) and the track(N), in the plot of the solid line. In addition, in the plot of the broken line, a switching track for the offset of the clock when reading and writing straddles the track(N−3) and the track(N−2).

It is possible to prevent the servo data from being erased by including a difference between the servo pattern frequencies due to the positional difference between the read head Hr and the write head Hw, as a margin in a format design of the data area DA. That is, a gap is included between areas of two different servo pattern frequencies. Meanwhile, in order to perform more precise servo processing, the positional difference between the read head Hr and the write head Hw can also be obtained by calculation each time. A clock when reading and writing user data is generated by a time base generator (TBG) and is independent of a servo clock. Therefore, the reference TBG is also set for the TBG, an offset calculation of the DSW correction value illustrated in the above equation is performed, and a correction value according to the position of the magnetic head Hrw is added to the reference TBG. As such, more accurate servo processing can be performed by determining the reference TBG switching track in consideration of the offset of the clock at the time of reading and writing each data area DA. In addition, there is no need to take the margin (i.e., employ an unused gap) as described above, and thus, it is possible to increase the data area DA.

Example of Control Processing of Magnetic Disk Device

Figure 7:
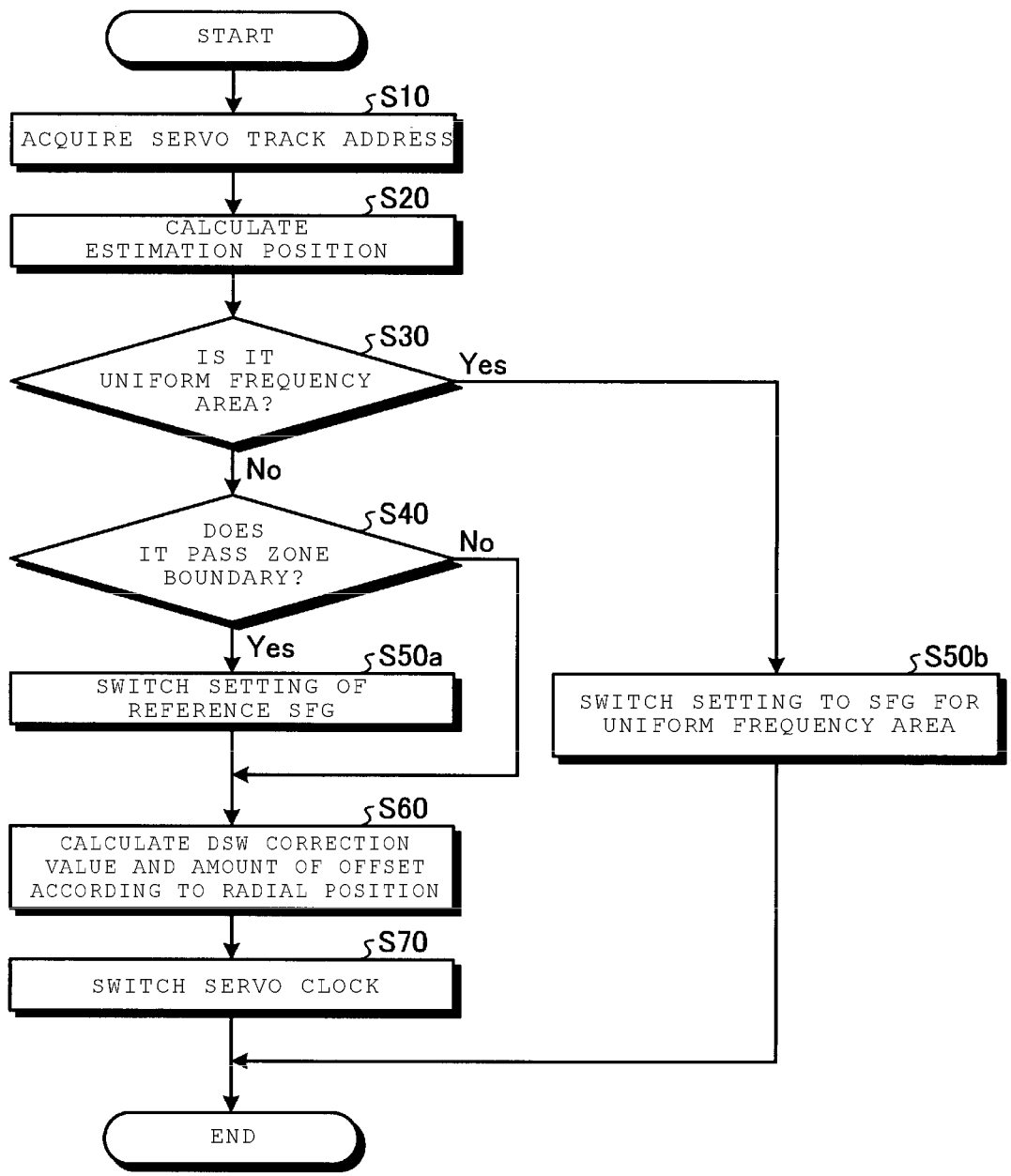
FIG. 7 is a flowchart illustrating an example of a control processing sequence of the magnetic disk device according to the embodiment.

Next, an example of controlling the magnetic disk device 1 will be described with reference to FIG. 7. FIG. 7 is a flowchart illustrating an example of a sequence of steps in the control of the magnetic disk device 1 according to the embodiment.

As illustrated in FIG. 7, when the magnetic head Hrw is on-tracked to a predetermined servo, the read write channel 53 reads servo data in step S10, and the hard disk control unit 54 acquires a track address of the servo. In step S20, the hard disk control unit 54 causes the estimation observer 54B to calculate an estimated position of the magnetic head Hrw in the magnetic disk 10.

In step S30, the hard disk control unit 54 determines from the track address and the estimated position information whether or not the magnetic head Hrw is disposed in any of the uniform frequency areas Su0 and Su7. When the magnetic head is in one of the uniform frequency areas Su0 and Su7 (Yes), the hard disk control unit 54 causes the zone servo switching unit 54A to switch setting of the read write channel 53 to SFG for uniform frequency area in step S50b, and ends the control of the magnetic disk device 1.

When the magnetic head Hrw is not in one of the uniform frequency areas Su0 or Su7 in step S30 (No), the hard disk control unit 54 determines whether or not the magnetic head Hrw passes through any of boundaries between the zones Z0 to Z7 in step S40. When it is determined that the magnetic head passes through a boundary between the zones (Yes), the hard disk control unit 54 causes the zone servo switching unit 54A to switch the reference SFG of the read write channel 53 in step S50a. When the magnetic head does not pass through the boundary between the zones (No), the processing proceeds to step S60.

In step S60, the hard disk control unit 54 causes the zone servo switching unit 54A to calculate a DSW correction value and the amount of offset according to a radial position of the magnetic head Hrw of the magnetic disk 10. In step S70, the hard disk control unit 54 causes the zone servo switching unit 54A to switch the servo clock, based on the DSW correction values and the amount of offset.

The control of the magnetic disk device 1 then ends.

Effects

Figure 8:
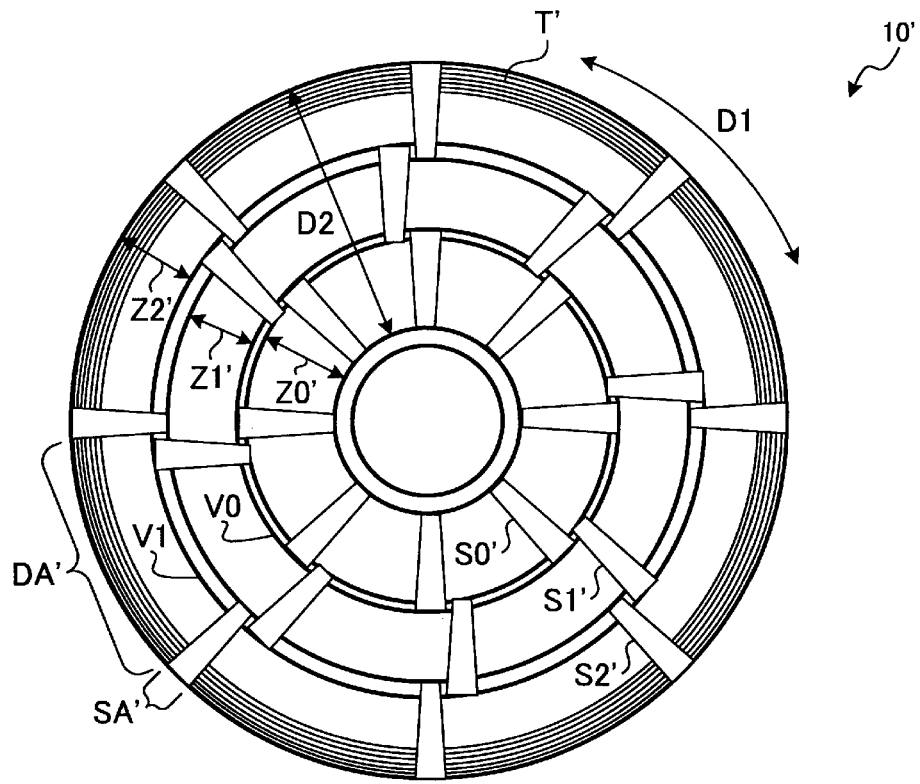
FIG. 8 is a diagram illustrating a configuration of a magnetic disk according to a comparative example.
Figure 8:
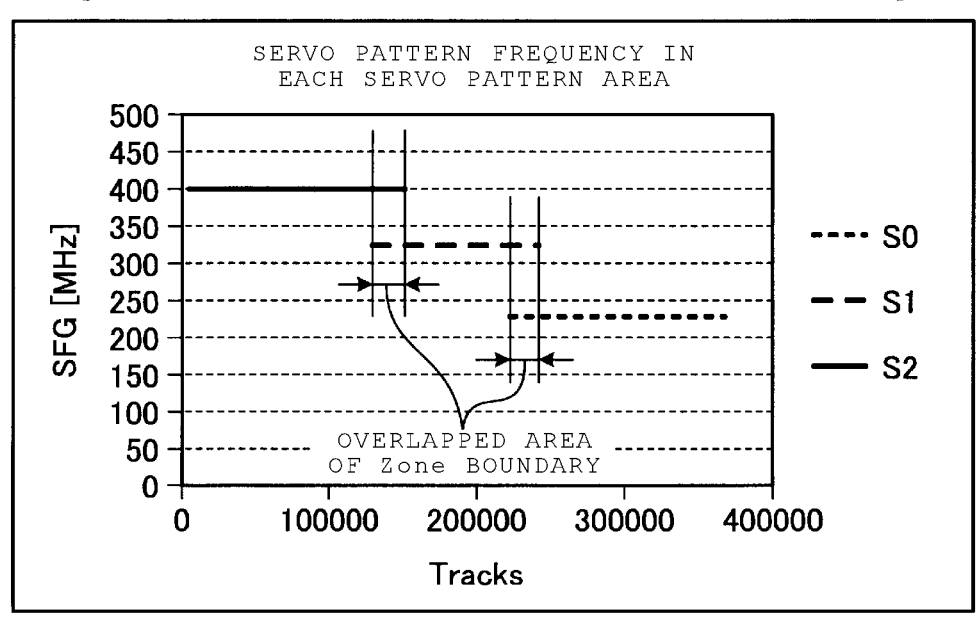

To describe effects of the magnetic disk device 1 according to the embodiment, a magnetic disk 10' is used in a magnetic disk device according to a comparative example will be described with reference to FIG. 8. FIG. 8 is a diagram illustrating a configuration of the magnetic disk 10' according to the comparative example. An upper portion of FIG. 8 is a plan view of the magnetic disk 10', and a lower portion thereof is a graph of a servo pattern frequency of the magnetic disk 10'.

As illustrated in the upper portion of FIG. 8, the magnetic disk 10' is divided into, for example, zones Z0' to Z2' in a radial direction D2. Servo patterns S0' to S2' are arranged so as to correspond to zones Z0' to Z2', respectively, in a servo area SA'. Each of the servo patterns S0' to S2' is set such that different servo pattern frequencies included therein decrease from the OD side to the ID side. The servo pattern frequencies are constant in each of the servo patterns S0' to S2'. At this time, the servo pattern frequencies in the servo patterns S0' to S2' are set so as to match the ID side with a small gap. Accordingly, a width of each of the servo patterns S0' to S2' in the circumferential direction D1 is wider on the OD side and is narrower on the ID side.

In addition, the servo patterns S0' to S2' are arranged so as to be shifted from each other by a predetermined width in the circumferential direction D1. In addition, the servo patterns S0' to S2' are arranged such that ends thereof overlap each other radially. By providing such overlapping areas V0 and V1, it is possible to prevent the servo patterns S0' to S2' from being undetected after the switching is performed even when there is an error in a switching timing between the servo patterns S0' to S2'. The overlapping areas V0 and V1 are invalid areas that cannot be accessed as a data area DA' in consideration of, for example, a case where a virtual circle control is applied. The virtual circle control is a control method of operating a magnetic head that assumes that the magnetic disk is a perfect circle, and positioning is performed in a manner that does not rely on the shape of the nearest servo track.

As described above, in the magnetic disk 10' according to the comparative example, the servo pattern frequencies in the servo patterns S0' to S2' are constant, and an invalid area which cannot be used as the data area DA' is generated. In addition, setting of the servo pattern frequency on the OD side in each of the servo patterns S0' to S2' is excessive in margin.

In the magnetic disk 10 according to the embodiment, the servo pattern frequencies also change in the servo patterns S0 to S7, and the changes in the servo pattern frequencies between the servo patterns S0 to S7 are gradual. Accordingly, in the magnetic disk device 1 according to the embodiment, switching between the respective servo patterns S0 to S7 can be smoothly performed without providing the overlapping areas described above in conjunction with the comparative example.

In addition, in the magnetic disk 10 according to the embodiment, no overlapping area (i.e., no invalid areas) are included. Accordingly, format efficiency of the magnetic disk 10 can be improved and the data area DA can be increased. In addition, in the magnetic disk device 1 according to the embodiment, virtual circle control is easily applied.

In addition, in the magnetic disk 10 according to the embodiment, a proper servo pattern frequency is set also on the OD side in each of the servo patterns S0 to S7, and the servo area SA can be reduced by that amount. By doing so, it is also possible to improve the format efficiency of the magnetic disk 10 and increase the data area DA.

Another Embodiment

In the above-described embodiment, different servo pattern frequencies of the magnetic disks 10 are tracked by providing a DSW correction value to which the amount of offset is added. However, the method for tracking the servo pattern frequency is not limited to this approach.

Initially, the change rate of the servo pattern frequency of the magnetic disk 10 is very small. Thus, the change in the servo pattern frequency of the magnetic disk 10 can be tracked by only employing a servo pattern frequency tracking capability of the read write channel 53 of the magnetic disk device 1.

Alternatively, the magnetic disk device 1 may have a configuration in which a table of the servo pattern frequencies set for each servo track address is included in the storage unit 55. In this case, the hard disk control unit 54 switches the servo pattern frequency according to a position of the magnetic head Hrw while referring to the table.

Alternatively, the hard disk control unit 54 may have a configuration in which the servo pattern frequency set for each servo track address is calculated in an inversely proportional manner.

Alternatively, instead of setting the reference SFG for each zone, one reference SFG may be applied over the overall magnetic disk 10, and an offset value may be assigned thereto.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic disk device comprising:
   a magnetic disk including at least one servo zone that includes a first data storage track with a first servo pattern having a first frequency and a second data storage track with a second servo pattern having a second frequency, wherein the first data storage track is located closer to an outer diameter of the magnetic disk than the second data storage track and the first frequency is greater than the second frequency;
   a magnetic head that faces the magnetic disk; and
   a switching circuit configured to switch a servo pattern frequency employed to position the magnetic head in a radial direction between the first and second frequencies based on a radial position of the magnetic head, and switch a servo clock frequency to be offset from a reference servo frequency for said at least one servo zone, wherein the reference servo frequency is a magnetic pole reversal rate per unit time at which the servo pattern in said at least one servo zone is written.

2. The magnetic disk device according to claim 1, wherein the magnetic disk includes a uniform frequency area that includes multiple data storage tracks that each have a respective servo pattern having a same frequency.

3. The magnetic disk device according to claim 2, wherein the uniform frequency area is disposed on at least one of an outer diameter side of the magnetic disk and an inner diameter side of the magnetic disk.

4. The magnetic disk device according to claim 1, wherein the at least one servo zone includes a first servo zone and a second servo zone,
   wherein the first data storage track and the second data storage track are disposed within the first servo zone, and
   wherein a third data storage track with a third servo pattern having a third frequency and a fourth data storage track with a fourth servo pattern having a fourth frequency are disposed within the second servo zone.

5. The magnetic disk device according to claim 4, wherein the third data storage track is located closer to the outer diameter of the magnetic disk than the fourth data storage track and the third frequency is greater than the fourth frequency.

6. The magnetic disk device according to claim 4, wherein the first servo zone has no portion that radially overlaps a portion of the second servo zone.

7. The magnetic disk device according to claim 1, wherein the at least one servo zone includes a plurality of servo zones, and
   wherein each of the plurality of servo zones has no portion that radially overlaps a portion of any other of the plurality of servo zones.

8. The magnetic disk device according to claim 1, wherein the at least one servo zone includes multiple servo zones, and there is a different reference servo frequency for each of the multiple servo zones.

9. The magnetic disk device according to claim 8, wherein the different reference servo frequency for each of the multiple servo zones is based on a radial position of the corresponding servo zone.

10. The magnetic disk device according to claim 1, wherein the switching circuit is further configured to switch the servo clock frequency based on an estimated position from a history of previous radial positions of the magnetic disk and on a position of the magnetic head.

11. The magnetic disk device according to claim 1, wherein the switching circuit is further configured to switch the servo clock frequency based at least in part on a radial offset between a read head of the magnetic head and a write head of the magnetic head.

12. The magnetic disk device according to claim 1, wherein the at least one servo zone includes a plurality of data storage tracks that each have a respective servo pattern associated therewith, and
   wherein a servo pattern frequency of the respective servo patterns changes in a radial direction in a stepwise fashion.

13. A control method of a magnetic disk device that includes a magnetic head and a magnetic disk, the method comprising:
   based on a radial position of the magnetic head, switching a servo pattern frequency employed to position the magnetic position in a radial direction between a first servo pattern frequency of a first servo pattern in a first data storage track of at least one servo zone of the magnetic disk and a second servo pattern frequency of a second servo pattern in a second data storage track of said at least one servo zone; and
   switching a servo clock frequency to be offset from a reference servo frequency for said at least one servo zone, wherein the reference servo frequency is a magnetic pole reversal rate per unit time at which the servo pattern in said at least one servo zone is written.

14. The magnetic disk device according to claim 13, wherein the first data storage track is located closer to an outer diameter of the magnetic disk than the first data storage track and the first frequency is greater than the second frequency.

15. A magnetic disk device comprising:
a magnetic disk including at least one servo zone that includes a first data storage track with a first servo pattern having a first frequency and a second data storage track with a second servo pattern having a second frequency, wherein the first data storage track is located closer to an outer diameter of the magnetic disk than the second data storage track and the first frequency is greater than the second frequency;
a magnetic head that faces the magnetic disk; and
a switching circuit configured to switch a servo pattern frequency employed to position the magnetic head in a radial direction between the first and second frequencies based on a radial position of the magnetic head, and switch a servo clock frequency to be offset from a setting of a reference servo frequency for said at least one servo zone, wherein the reference servo frequency is a magnetic pole reversal rate per unit time associated with the magnetic disk.

* * * * *